US009568583B2

(12) United States Patent
Caplan

(10) Patent No.: US 9,568,583 B2
(45) Date of Patent: Feb. 14, 2017

(54) ASYNCHRONOUS PULSE DETECTION THROUGH SEQUENTIAL TIME SAMPLING OF OPTICALLY SPREAD SIGNALS

(71) Applicant: ROSEMOUNT AEROSPACE INC., Burnsville, MN (US)

(72) Inventor: William Caplan, Northfield, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 633 days.

(21) Appl. No.: 14/067,000

(22) Filed: Oct. 30, 2013

(65) Prior Publication Data

US 2016/0161587 A1 Jun. 9, 2016

Related U.S. Application Data

(63) Continuation-in-part of application No. 13/924,028, filed on Jun. 21, 2013.

(51) Int. Cl.
| | | |
|---|---|---|
| *G01C 3/08* | (2006.01) | |
| *G01S 3/786* | (2006.01) | |
| *F41G 7/22* | (2006.01) | |
| *F41G 7/00* | (2006.01) | |
| *G01S 3/781* | (2006.01) | |

(Continued)

(52) U.S. Cl.
CPC .............. *G01S 3/786* (2013.01); *F41G 7/008* (2013.01); *F41G 7/226* (2013.01); *F41G 7/2253* (2013.01); *F41G 7/2293* (2013.01); *F41G 7/26* (2013.01); *G01S 3/781* (2013.01); *G01S 3/784* (2013.01)

(58) Field of Classification Search
CPC .................................... G01S 3/786; F41G 7/26
See application file for complete search history.

(56) References Cited

U.S. PATENT DOCUMENTS

| 6,111,241 A | 8/2000 | English et al. |
| 6,987,256 B2 | 1/2006 | English et al. |

(Continued)

FOREIGN PATENT DOCUMENTS

| FR | 2422178 A1 | 11/1979 |
| WO | 2012005781 A2 | 1/2012 |

OTHER PUBLICATIONS

European Search Report for European Application No. 14173475.6. Dated Feb. 9, 2015. (7 pgs).

(Continued)

*Primary Examiner* — Luke Ratcliffe
*Assistant Examiner* — Samantha K Abraham
(74) *Attorney, Agent, or Firm* — Cantor Colburn LLP

(57) ABSTRACT

A method to spread laser photon energy over separate pixels to improve the likelihood that the total sensing time of all the pixels together includes the laser pulse. The optical signal is spread over a number of pixels, N, on a converter array by means of various optical components. The N pixels are read out sequentially in time with each sub-interval short enough that the integration of background photons competing with the laser pulse is reduced. Likewise, the pixel read times may be staggered such that laser pulse energy will be detected by at least one pixel during the required pulse interval. The arrangement of the N pixels may be by converter array column, row, two dimensional array sub-window, or any combination of sub-windows depending on the optical path of the laser signal and the capability of the ROIC control.

13 Claims, 9 Drawing Sheets

(51) Int. Cl.
*G01S 3/784* (2006.01)
*F41G 7/26* (2006.01)

(56) References Cited

U.S. PATENT DOCUMENTS

| | | |
|---|---|---|
| 7,858,939 B2 | 12/2010 | Tener et al. |
| 8,164,037 B2 | 4/2012 | Jenkins et al. |
| 8,344,302 B1 | 1/2013 | Murphy et al. |
| 2005/0068517 A1* | 3/2005 | Evans .................... G01S 7/481 356/5.01 |
| 2005/0224706 A1 | 10/2005 | Von Rosenberg, Jr. |
| 2006/0054780 A1* | 3/2006 | Garrood ................ B82Y 20/00 250/208.1 |
| 2007/0129853 A1 | 6/2007 | Greenfeld |
| 2008/0099438 A1* | 5/2008 | Chen ...................... B82Y 10/00 216/67 |
| 2009/0228159 A1 | 9/2009 | Flowers et al. |
| 2010/0001119 A1 | 1/2010 | Lindgren |
| 2010/0127174 A1 | 5/2010 | Tener et al. |
| 2011/0071703 A1 | 3/2011 | Schoettl |
| 2012/0248288 A1 | 10/2012 | Linder et al. |
| 2012/0312912 A1* | 12/2012 | Murphy ................. F41G 7/007 244/3.16 |

OTHER PUBLICATIONS

European Search Report for European Application No. 14173554.8. Dated Mar. 4, 2015. (7 pages).
S. Park, et al., "Super-Resolution Image Reconstruction: A Technical Overview," Signal Processing Magazine, IEEE, vol. 20; No. 3; pp. 21, 36, May 2003.

\* cited by examiner

ASYNCHRONOUS PULSE DETECTION THROUGH SEQUENTIAL TIME SAMPLING OF OPTICALLY SPREAD SIGNALS

PRIORITY

The present application for patent is a continuation in part of, and claims priority to, the following co-pending U.S. patent application:

"SEEKER HAVING SCANNING-SNAPSHOT FPA" by Todd A. Ell, having U.S. patent application Ser. No. 13/924,028, filed Jun. 21, 2013, assigned to the assignee hereof, and expressly incorporated by reference herein.

REFERENCE TO CO-PENDING APPLICATIONS FOR PATENT

The present application for patent is related to the following co-pending U.S. patent applications:

"HARMONIC SHUTTERED SEEKER" by Todd A. Ell and Robert D. Rutkiewicz, having U.S. patent application Ser. No. 13/923,986, filed Jun. 21, 2013, assigned to the assignee hereof, and expressly incorporated by reference herein;

"LASER-AIDED PASSIVE SEEKER" by Todd A. Ell, having U.S. patent application Ser. No. 13/923,923, filed Jun. 21, 2013, assigned to the assignee hereof, and expressly incorporated by reference herein; and "SEEKER HAVING SCANNING-SNAPSHOT FPA" by Todd A. Ell, having U.S. patent application Ser. No. 13/924,028, filed Jun. 21, 2013, assigned to the assignee hereof, and expressly incorporated by reference herein.

FIELD OF DISCLOSURE

The subject matter disclosed herein relates in general to guidance subsystems for projectiles, missiles and other ordnance. More specifically, the subject disclosure relates to the target sensing components of guidance subsystems used to allow ordnance to persecute targets by detecting and tracking energy scattered from targets.

BACKGROUND

Seeker guided ordnances are weapons that can be launched or dropped some distance away from a target, then guided to the target, thus saving the delivery vehicle from having to travel into enemy defenses. Seekers make measurements for target detection and tracking by sensing various forms of energy (e.g., sound, radio frequency, infrared, or visible energy that targets emit or reflect). Seeker systems that detect and process one type of energy are known generally as single-mode seekers, and seeker systems that detect and process multiples types of energy (e.g., radar combined with thermal) are generally known as multi-mode seekers.

Seeker homing techniques can be classified in three general groups: active, semi-active, and passive. In active seekers, a target is illuminated and tracked by equipment on board the ordnance itself. A semi-active seeker is one that selects and chases a target by following energy from an external source, separate from the ordnance, reflecting from the target. This illuminating source can be ground-based, ship-borne, or airborne. Semi-active and active seekers require the target to be continuously illuminated until target impact. Passive seekers use external, uncontrolled energy sources (e.g., solar light, or target emitted heat or noise). Passive seekers have the advantage of not giving the target warning that it is being pursued, but they are more difficult to construct with reliable performance. Because the semi-active seekers involve a separate external source, this source can also be used to "designate" the correct target. The ordnance is said to then "acquire" and "track" the designated target. Hence both active and passive seekers require some other means to acquire the correct target.

In semi-active laser (SAL) seeker guidance systems, an operator points a laser designator at the target, and the laser radiation bounces off the target and is scattered in multiple directions (this is known as "painting the target" or "laser painting"). The ordnance is launched or dropped somewhere near the target. When the ordnance is close enough for some of the reflected laser energy from the target to reach the ordnance's field of view (FOV), a seeker system of the ordnance detects the laser energy, determines that the detected laser energy has a predetermined pulse repetition frequency (PRF) from a designator assigned to control the particular seeker system, determines the direction from which the energy is being reflected, and uses the directional information (and other data) to adjust the ordnance trajectory toward the source of the reflected energy. While the ordnance is in the area of the target, and the laser is kept aimed at the target, the ordnance should be guided accurately to the target.

Multi-mode/multi-homing seekers generally have the potential to increase the precision and accuracy of the seeker system but often at the expense of increased cost and complexity (more parts and processing resources), reduced reliability (more parts means more chances for failure or malfunction), and longer target acquisition times (complex processing can take longer to execute). For example, combining the functionality of a laser-based semi-active seeker with an image-based passive seeker could be done by simple, physical integration of the two technologies; however, this would incur the cost of both a focal plane array (FPA) and quad cell photo diodes with its associated diode electronics. Likewise, implementing passive image-based seekers can be expensive and difficult because they rely on complicated and resource intensive automatic target acquisition algorithms to distinguish an image of the target from background clutter under ambient lighting.

Because seeker systems tend to be high-performance, single-use items, there is continued demand to reduce the complexity and cost of seeker systems, particularly multi-mode/multi-homing seeker systems, while maintaining or improving the seeker's overall performance.

SUMMARY

The disclosed embodiments include a system for asynchronous pulse comprising: a converter array; and an optical system configured to pass laser energy comprising a predetermined band of wavelengths to said array; wherein said optical system spreads said predetermined band of wavelengths across a predetermined area of said array. The system may further comprise a controller and a read out integrated circuit (ROIC) that scans said predetermined area of said array at an exposure rate that matches a predetermined PRF to thereby decode said laser energy spread by said optical system across said predetermined area of said array.

The disclosed embodiments further include a method for detecting laser energy comprising: filtering laser energy having a predetermined bandwidth; and spreading said predetermined bandwidth of wavelengths across a predetermined area of an array. The method may further comprise scanning said predetermined area of said array at an exposure rate that matches a predetermined pulse repetition frequency (PRF) to thereby decode said laser energy that has been spread across said predetermined area of said array.

BRIEF DESCRIPTION OF THE DRAWINGS

The accompanying drawings are presented to aid in the description of embodiments of the invention and are provided solely for illustration of the embodiments and not limitation thereof.

In the accompanying figures and following detailed description of the disclosed embodiments, the various elements illustrated in the figures are provided with three-digit reference numbers. The leftmost digit of each reference number corresponds to the figure in which its element is first illustrated.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
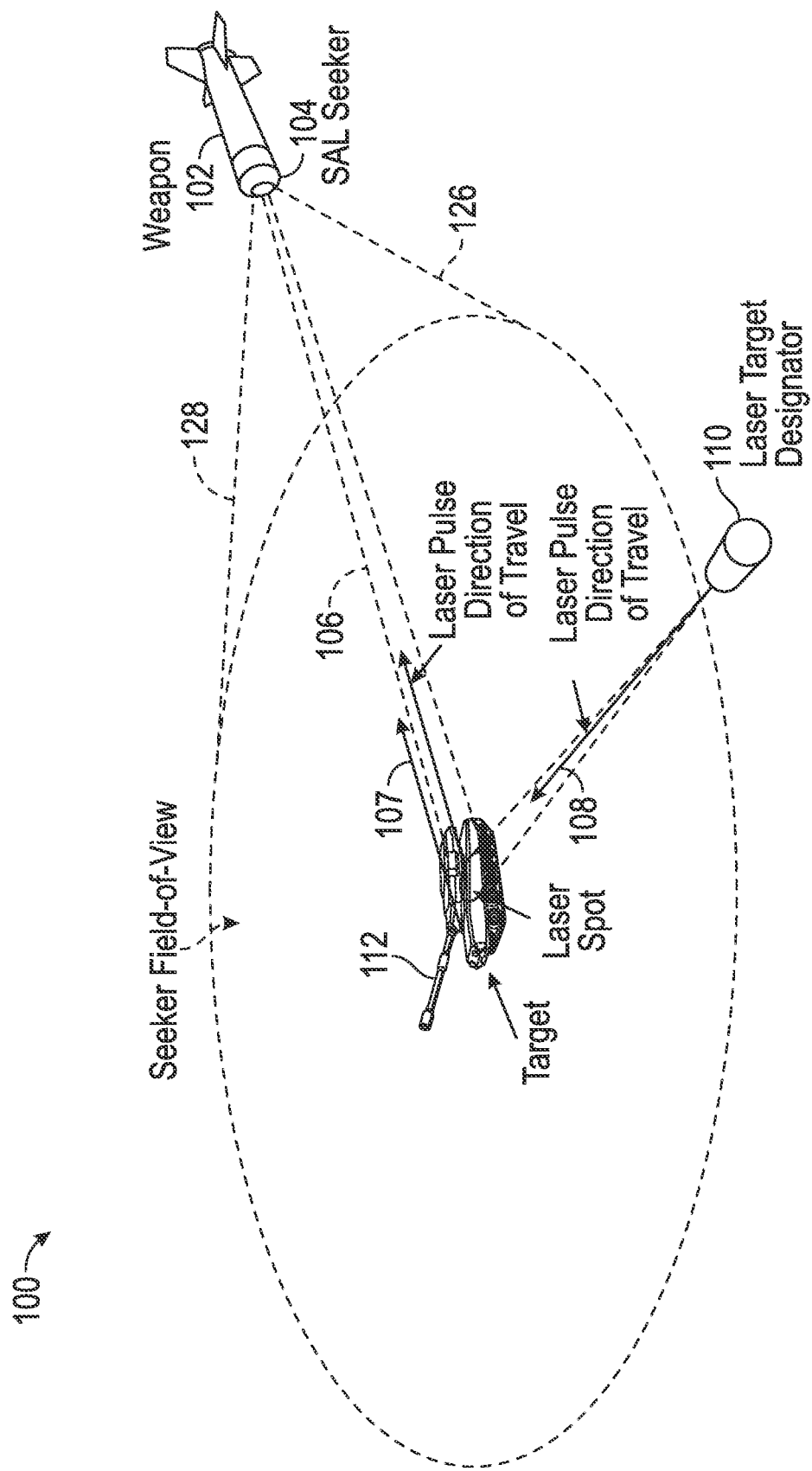
FIG. 1 is a schematic illustration of a seeker guided projectile engaging a target.

FIG. 1 is a schematic diagram of a precision guided ordnance system 100 capable of utilizing the disclosed embodiments. As shown in FIG. 1, a seeker guided ordnance (shown as a projectile 102) may engage a target 112 by using a seeker system 104 of the ordnance/projectile 102 to detect and follow energy 106, 107 that has been reflected from the target 112 into the sensor system's field-of-view (FOV). The sensor system's FOV is generally illustrated in FIG. 1 as the area between directional arrows 126, 128. The reflected energy may be laser energy 106 or some other energy 107 (e.g. ambient light for deriving an image). The seeker system 104 may be equipped with sufficient sensors and other electro-optical components to detect energy in various portions of the electromagnetic spectrum, including the visible, infrared (IR), microwave and millimeter wave (MMW) portions of the spectrum. The seeker system 104 may incorporate one or more sensors that operate in more than one portion of the spectrum. Single-mode implementations of the seeker system 104 utilize only one form of energy to detect, locate and localize the target 112. Multi-mode implementations of the seeker system 104 utilize more than one form of energy to detect, locate and localize the target 112. In the present disclosure, the term "detect," when used in connection with reflected laser energy, generally refers to sensing energy from an unknown target. The term "decode" refers to verifying that a PRF of the detected laser energy matches the pre-determined, expected PRF of the projectile/designator pair. The term "lock" refers to time synchronization of the pulse occurrence with a seeker clock. The term "localize" refers to resolving where the detected, decoded laser energy occurs in the sensor system's field of view (126, 128).

Continuing with FIG. 1, the target 112 is shown as a military tank but may be virtually any object capable of reflecting energy, including for example another type of land vehicle, a boat or a building. For laser-based implementations, the target 112 may be illuminated with laser energy 108 from a laser designator 110. The laser designator 110 may be located on the ground, as shown in FIG. 1, or may be located in a vehicle, ship, boat, or aircraft. The designator 110 transmits laser energy 108 having a certain power level, typically measured in mega-watts, and a certain PRF, typically measured in hertz. Each designator 110 and projectile 102 set is provided with the same, unique PRF code. For laser-based implementations, the seeker system 104 must identify from among the various types of detected energy reflected laser energy 106 having the unique PRF assigned to the projectile 102 and designator 110 pair. Laser-based seeker systems are generally referred to as "semi-active" imaging seekers because they require that a target is actively illuminated with laser energy in order to detect, decode and localize the target. Image-based seeker systems known as "passive" track targets using uncontrolled illumination sources (e.g., solar energy) and relatively complicated and potentially costly automatic target tracking algorithms and processing resources to distinguish an image of the target from background clutter under ambient lighting. Thus, the seeker system 104, which may be equipped with single-mode, multi-mode, active and/or passive homing functionality, uses information (e.g., PRF, an angle of incidence, images) derived from the reflected energy 106, 107, along with other information (e.g., GPS coordinates), to identify the location of the target 112 and steer the projectile 102 to the target 112.

Turning now to an overview of the disclosed embodiments, an important performance parameter for seeker systems, particularly multi-mode systems, includes how quickly, reliably and efficiently the seeker system detects, decodes and localizes the energy it receives in its FOV. The seeker system must be sensitive to both background scene energy and reflected laser energy. Because the arrival time of a reflected laser energy pulse is not known to the seeker system, the PRF of the laser pulse energy is asynchronous to the seeker system's internal clock. Thus, the disclosed embodiments provide configurations and methodologies to sense the asynchronous laser pulse while receiving the background scene photons. Further, the disclosed embodiments take advantage of the capability to merge two uniquely different types of seeker functionality (e.g., semi-active laser-based and passive ambient energy-based images) into a single, dual-mode seeker, using only an FPA as the active sensor to achieve both modes of operation. Known methods of detecting, decoding and localizing energy within a seeker's field of view typically require expensive and complicated systems to compensate for the likelihood of not detecting, decoding or localizing a received pulse when the received pulse actually matches the seeker's pre-loaded PRF. Because the pulses are typically ten to twenty nanoseconds wide with a pre-loaded PRF from ten to twenty hertz, conventional imagers use an "integration" process to detect and decode the pulse. Using an integration process precludes the use of a camera having a relatively long exposure time because a long exposure time would increase the likelihood of capturing several pulses when the imager opens the shutter. Also, because every shutter cycle has an "expose" time when the shutter is open and a "dark time" when the shutter is closed, conventional integration processes increase the likelihood that a pulse will be missed during the dark time.

One way to improve the detection, decoding and localization of a seeker system is to provide the seeker system with the capability of processing more than one type of energy to identify a target, for example, radar, laser and/or imaging energy. As described previously herein, a seeker system capable of processing more than one type of energy for target acquisition is known generally as a multi-mode seeker. Multi-mode seeker systems have the advantage of being robust and reliable and may be operated over a range of environments and conditions. However, combining more than one target acquisition mode into a single seeker typically adds redundancy. For example, conventional multi-mode implementations require two disparate sensor systems, with each sensor system having its own antenna and/or lens, along with separate processing paths. This increases the number of parts, thereby increasing cost. Cost control is critical for single-use weapons that may sit on a shelf for 10 years then be used one time. More parts also increase the probability of a part malfunctioning or not performing the way it is expected to perform.

Accordingly, the present disclosure recognizes that providing configurations and methodologies to asynchronously detect and decode the arrival time of a reflected laser energy pulse has the potential to improve reliability and performance. The present disclosure further recognizes that multi-tasking components/functionality of a multi-mode seeker so that one component (e.g., sensor, lens) can operate in both modes has the potential to control costs and improve reliability and performance. For example, the converter array (which may be implemented as a focal-plane-array (FPA)) of a seeker system converts reflected energy in the seeker's FOV into electrical signals that can then be read out, processed and/or stored. Using only a single, conventional FPA as the converter array of the primary optical component in more than one mode would potentially reduce the complexity and cost, and improve the reliability of multi-mode seeker systems.

The design challenges of using only the converter array output to detect, decode and localize the laser spot in a seeker's FOV include challenges associated with the digital imager, the exposure gap, avoiding ambient confusion and avoiding designator confusion. Conventional digital imagers, as previously described, are inherently sampled data, integrate-and-dump systems. The imager accumulates or integrates all of the received energy across the entire expose time, effectively low-pass filtering the signals, blending multiple pulses arriving at different times into a single image. Given that two or more designators can be active in the same target area, the sample time resolution of conventional digital imagers is typically insufficient to reconstruct all the incoming pulses. This typically requires expensive and complicated systems to compensate for a higher likelihood of not detecting, decoding or localizing a received pulse when the received pulse actually matches the seeker's pre-loaded PRF. Using an integration process precludes the use of a camera having a relatively long exposure time because a long exposure time would increase the likelihood of capturing several pulses when the imager opens the shutter. Imager exposure gaps, or exposure windows, typically span the pulse repetition interval of the predetermined PRF so cannot distinguish constant light sources from designator pulses. Accordingly, sub-interval exposure windows cannot be made to cover 100% of a pulse interval due to a minimum time to complete a frame, capture and initialize the imager for the next frame. In other words, the dead-time (also known as the "dark time" of the imager) between exposure windows (measured in microseconds) is wider than typical designator pulse widths (measured in 10-100 nanoseconds). Background clutter levels may potentially be reduced by decreasing the exposure time, but this increases the probability that a laser pulse will be missed altogether. Ambient confusion occurs when the imager has difficulty distinguishing between ambient light features and designator energy. Reflected energy is proportional to the angle of reflection of the target, i.e., acute angles between light source and imager yield higher reflected energy, and obtuse angles yield lower reflected energy. Also, solar glint or specular reflection off background clutter is a difficult problem with respect to relative energy. For example, a top-down attack with the sun "over the shoulder" of the weapon, and a ground-based designator with an almost 90 degree reflection angle is the worst geometry for engagement/designation with respect to received laser energy. So a clear day at noon time is the most challenging. Finally, so that multiple designators can operate simultaneously in the same target area, a single converter array design must reliably distinguish its assigned designator from other, "confuser" designators operating simultaneously in the same target area.

FIGS. 2 to 7 illustrate embodiments of the present disclosure and will be described in more detail below. As an overview of one configuration of the disclosed embodiments (best shown in FIGS. 2 and 3), the present disclosure describes a seeker system that uses a converter array, which is preferably implemented as a focal-plane-array (FPA) configured and controlled such that the FPA is capable of being shuttered or exposed across the entire array face in a snapshot mode or shuttered, pixel-by-pixel, in a rolling mode. The optics ahead of the FPA includes a lens system configured in a binocular arrangement to focus incoming light onto separate halves of a single FPA. The two FPA halves provide identical fields-of-view. One FPA half includes a wavelength specific lens to defocus a narrow band of wavelengths. By switching the defocused FPA half between rolling mode and snapshot mode, and by operating the other FPA half only in snapshot mode, the defocused FPA half cannot spatially resolve the laser pulse but can temporally resolve it. Conversely, the standard FPA half (snapshot mode only) cannot temporally resolve the laser pulses but is capable of spatially resolving the laser pulse. Both halves can spatially resolve ambient light images given sufficient exposure times. This allows the FPA and associated readout electronics (ROIC) to detect, decode and localize in the seeker's field-of-view a laser target designator (LTD) with a known PRF in the presence of ambient light and other confusing LTD's (friendly & foe) each with different PRF's.

In alternative configurations of the disclosed embodiments (best shown in FIGS. 4 to 7), there are provided further methods of asynchronously detecting and decoding pulse energy by spreading the pulse energy (e.g., a laser pulse) over many separate pixels of a converter array (e.g., a FPA) so that the sensing time of all the pixels together includes the laser pulse. The laser energy is spread over a number of pixels, N, in the FPA by means of optical components (e.g., defocus lens or diffractive optical element). The N pixels are read out sequentially in time with each sub-interval short enough that the integration of background photons competing with the laser energy pulse is reduced. Likewise, the pixel read times are staggered (i.e., arranged in alternating or overlapping time periods) such that laser pulse energy will be detected by at least one pixel during the required pulse interval. The arrangement of the N pixels may be by FPA column, row or two-dimensional array sub-window, depending on the capability of the ROIC control. Note that N need not be equal to the total number of detectors in the FPA. Further, while the embodiments of the optical system 216 and converter array 217 for capturing laser pulse energy 106 are disclosed in connection with the dual mode, scanning-snapshot implementation, the dual mode, scanning-snapshot implementation is not the only application of the disclosed asynchronous pulse detection and decoding system and methodologies. Additional details of these embodiments will be described later in this disclosure in connection with a more detailed description of FIGS. 3 to 7.

Thus, the disclosed embodiments allow two uniquely different types of seeker functionality to be merged into a single, dual-mode seeker, using only an FPA as the active sensor to achieve both modes of operation. Additionally, the disclosed embodiments also provide a means of sampling target-reflect laser pulses at sufficient sample rates to decode any pulse modulated data transmitted from a laser target designator. This allows for a channel of communications between the weapon receiving the transmission and the laser target designator. The weapon and designator can thus to be 'paired' to work in unison and mission critical information, such a designator determined target position (GPS coordinates) and velocity, can be transmitted to the weapon in flight.

Figure 2:
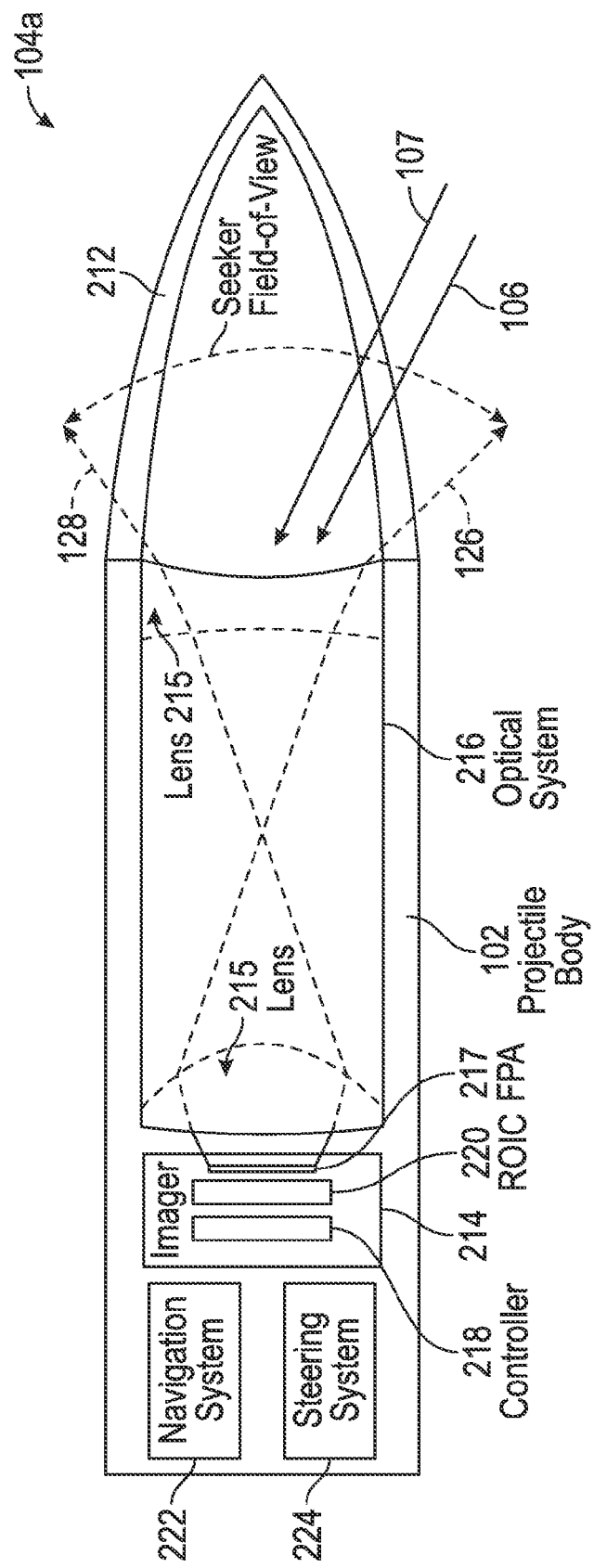
FIG. 2 is a high level block diagram showing additional details of a seeker system of the disclosed embodiments, wherein only an FPA is used as the active sensor to achieve both the semi-active laser-based and the passive modes of homing operation.

With reference now to the accompanying illustrations, FIG. 2 is a block diagram illustrating a seeker system 104a of the disclosed embodiments. Seeker system 104a corresponds to the seeker system 104 shown in FIG. 1, but shows additional details of how the seeker system 104 may be modified to provide a single imager 214, which is preferably a shortwave infrared (SWIR) imager or its equivalent, that is capable of capturing both laser and image data through a single converter array, which may be implemented as a FPA 217. In accordance with the disclosed embodiments, the single FPA 217 is configured and arranged to be sensitive to the typical wavelengths of laser target designators. As such, imager 214 can detect the laser radiation reflected from a target. The disclosed embodiments provide means for synchronizing the imager's shutter or exposure time with the reflected laser pulse to ensure the laser pulse is captured in the image. In contrast, a non-SWIR imager is not sensitive to laser light and requires a separate sensor to capture laser light and integrate it with an image. The above-described reflected laser energy captured by an imager is referred to herein as "semi-active laser" (SAL) energy, and the captured images containing the laser spot are referred to herein "semi-active images" (SAI). Therefore, the frame rate of the imager 214 may be configured to match the pulse repetition interval (PRI) of the laser designator 110 (shown in FIG. 1) (i.e., the frame rate=1/PRI).

Thus, the seeker system 104a of FIG. 2 is capable of providing multi-mode functionality and includes a seeker dome 212, an imager 214, a navigation system 222 and a steering system 224. The seeker dome 212 includes a FOV identified by the area between arrows 126, 128. Reflected laser energy 106 and other energy 107 (e.g., ambient light or image energy) within the FOV 126,128 may be captured by the seeker system 104a. The imager 214 includes an optical system 216 having a lens system 215, a readout integrated circuit (ROIC) 220 and control electronics 218. The imager 214 includes a detector that is preferably implemented as the single FPA 217. The imager components (217, 218 and 220), along with the optical components (215, 216), are configured and arranged as described above to focus and capture incoming energy (e.g., reflected laser energy 106 and/or ambient light energy 107). The FPA 217 and ROIC 220 convert incoming laser or ambient light energy 106, 107 to electrical signals that can then be read out and processed and/or stored. The control electronics stage 218 provides overall control for the various operations performed by the FPA 217 and the ROIC 220 in accordance with the disclosed embodiments. The imager 214 generates signals indicative of the energy 106, 107 received within the imager's FOV (126, 128), including signals indicative of the energy's PRF and the direction from which the pulse came. The navigation system 222 and steering system 224 utilize data from the imager 214, along with other data such as GPS, telemetry, etc., to determine and implement the appropriate adjustment to the flight path of the projectile 102 to guide the projectile 102 to the target 112 (shown in FIG. 1). Although illustrated as separate functional elements, it will be understood by persons of ordinary skill in the relevant art that the various electro-optical components shown in FIG. 2 may be arranged in different combinations and implemented as hardware, software, firmware, or a combination thereof without departing from the scope of the disclosed embodiments.

Figure 3:
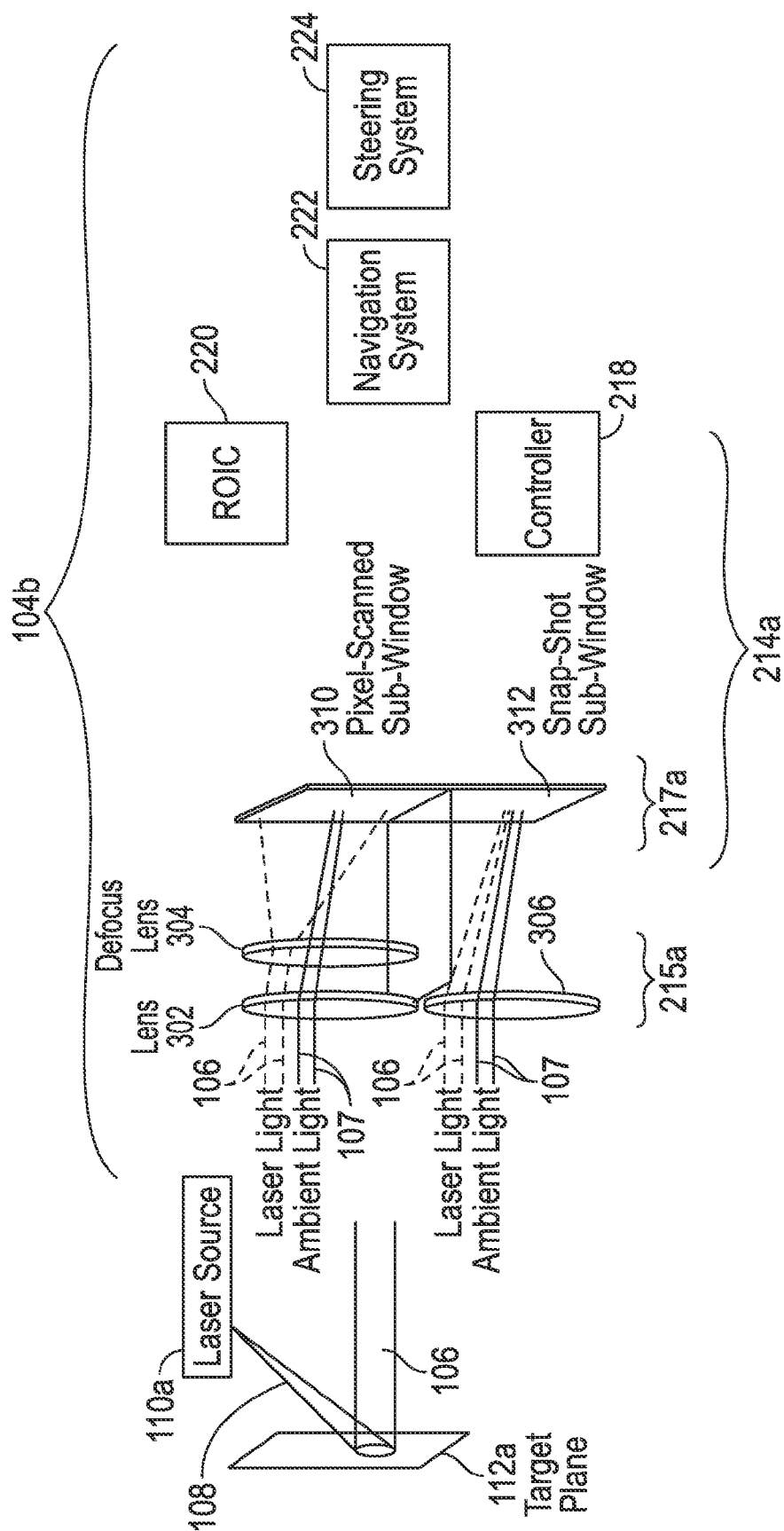
FIG. 3 is a schematic illustration of an optical system and FPA configuration of the disclosed embodiments, wherein only the FPA is used as the active sensor to achieve both the semi-active laser-based and the passive ambient energy-based modes of operation.

FIG. 3 is a block diagram illustrating additional details of a seeker system 104b of the disclosed embodiments. Seeker system 104b corresponds to the seeker system 104a shown in FIG. 2, but shows additional details of how the seeker system 104a may be implemented as a single imager 214a, which is preferably a shortwave infrared (SWIR) imager or its equivalent, that is capable of imaging both laser and ambient energy data through a single converter array, which may be implemented as a FPA 217a. The imager must be sensitive to both background scene energy 107 and reflected laser energy 106. Because the arrival time of a reflected laser energy pulse 106 is not known to the imager 214a, the PRF of the laser pulse energy 106 is asynchronous to FPA's internal clock. Thus, the imager 214a is provided with configurations and methodologies to sense the asynchronous laser pulse while receiving the background scene photons.

The imager 214a is configured and arranged to control the exposure timing of each pixel in the FPA 217a. The pixels can either be shuttered (or exposed) at the same time, creating a snapshot mode, or the pixels may be scanned, creating a pixel-by-pixel rolling mode. The seeker system 104a further includes an optical system 216 (shown in FIG. 2), which includes a lens configuration 215a (shown in FIG. 3) having a first lens 302, a second lens 306 and a defocus lens 304 configured and arranged as shown. The seeker system 104b is further designed to control sub-windows 310, 312 of the FPA 217a in either the rolling mode or the snapshot modes. The optical system 215a is configured and arranged such that the sub-windows 310, 312 of the FPA 217a each see the same field-of-view (i.e., a binocular arrangement). The defocusing lens 304 may be tuned to the laser wavelength, whereby it operates as a lens to only a narrow band of wavelengths. All other wavelengths pass through unchanged. Because the asynchronous laser pulses for seeker applications tend to be tightly controlled to a narrow bandwidth, the laser spot will be spread across its portion of the FPA 217a.

Because the laser light energy 106 has photon density that is much higher than the photon density of the ambient light energy 107, the amount of time necessary to accumulate a single laser pulse's photons is typically measured in nanoseconds (i.e., 10-200 nanoseconds), while the amount of time necessary to accumulate ambient light energy photons to the same photon count as the laser light energy is measured in microseconds. The actual exposure time depends on the total field-of-view of each lens, but typically falls in this time range under full sunlight conditions. This exposure difference means that the dominant photons captured by the FPA 217a will be from the laser light energy 106 when the exposure time of each pixel is in the nanosecond range. However, as the exposure times are lengthened the ambient light energy photons will dominate the resulting image with some blurring due to the laser pulse and ambient light at the laser wavelength.

If the defocused sub-window 310 of a high pixel density FPA (e.g., a 1280×1024=1.3M pixel array) is scanned so that the scan time across the array is matched to the PRF of the laser, then incoming laser pulses will be digitized at a very high sample rate because the pulse will arrive at all pixels at roughly the same time (hence the reason for the defocusing lens). This would allow the system to optionally transmit data via pulse modulation on the laser beam to be received and decoded by the system. The exposure overlap ensures that very narrow time pulses are not missed between pixel readouts. It should be noted that the optical communication channel described herein is additional capability but is not necessary for the disclosed embodiments to "decode" the PRF of the laser designator. A system for receiving additional data encoded on a laser beam is disclosed in U.S. Pat. No. 8,344,302, and the entire disclosure of this patent is incorporated by reference in its entirety.

The defocused window 310 may be switched to snapshot mode and exposed long enough so that ambient light dominates the image. Under this configuration, the resultant image can be combined with the image from sub-window 312 of the FPA 217a to recover pixel resolution of the entire array via image processing super-resolution techniques. Ideally the two images would not be perfectly co-aligned but offset by half a pixel distance to maximize the super resolution results, but this is not necessary for the super-resolution techniques to work. Because the asynchronous pulse arrival times can now be predicted by the scanning sub-window 310, the longer duration exposures of both sub-windows 310, 312 can be optimized to either enhance the laser spot (by centering the sub-window 312 exposure time on the laser pulses and shortening the total exposure) or eliminate the laser spot entirely (by shuttering out of sync with the laser pulses).

Sub-window 312 images the laser spot in order to spatially localize the spot and determine bearing angles to the spot. Effectively, the defocused sub-window 310 cannot spatially resolve the laser pulses but can temporally resolve them. Conversely, sub-window 312 cannot temporally resolve the laser pulses but is capable of spatially resolving the laser pulses. Both sub-windows 310, 312 can spatially resolve ambient light images given sufficient exposure times.

Figure 4:
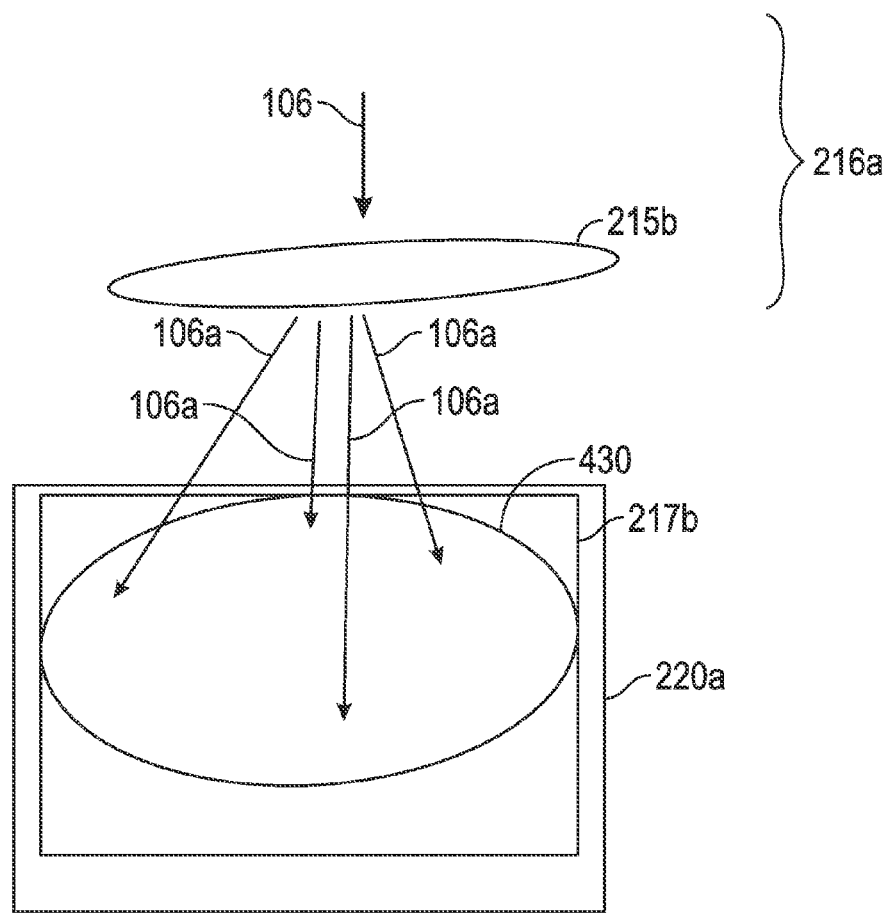
FIG. 4 is a schematic illustration of an asynchronous pulse detection configuration of the disclosed embodiments.

FIGS. 4 to 7 are schematic illustrations showing additional asynchronous pulse detection configurations and methodologies of the disclosed embodiments that focus and capture laser energy 106. More specifically, FIGS. 4 to 7 illustrate additional embodiments of the optical system 216 shown in FIG. 2 and the lens configuration 215a shown in FIG. 3. Note that while the various embodiments of the optical system 216 for capturing laser pulse energy 106 are disclosed in connection with the dual mode, scanning-snapshot implementation, the dual mode, scanning-snapshot implementation is not the only application of the disclosed asynchronous pulse detection and decoding system and methodologies. As shown in FIG. 4, the laser energy 106 is a short duration laser pulse. Optical system 216a includes a lens configuration 215b configured to spread the downstream laser energy 106a in a controlled manner over a predetermined area 430 of the FPA 217b. The ROIC 220a sequentially samples subsets of the FPA (e.g., pixel or pixel groups) such that the laser energy arrival time is sampled during the FPA read out cycle. Thus, the methods of the disclosed embodiments spread the laser energy over many separate pixels so that the sensing time of all the pixels together includes the laser pulse. The laser energy 106a is spread over a number of pixels, N, in the FPA 217b by means of optical components (e.g., defocus lens or diffractive optical element). The N pixels are read out sequentially in time with each sub-interval short enough that the integration of background photons competing with the laser energy pulse is reduced. Likewise, the pixel read times are staggered (i.e., arranged in alternating or overlapping time periods) such that laser pulse energy will be detected by at least one pixel during the required pulse interval. The arrangement of the N pixels may be by FPA column, row or two-dimensional array sub-window, depending on the capability of the ROIC controller 218 (shown in FIG. 3). Note that N need not be equal to the total number of detectors in the FPA.

Figure 5:
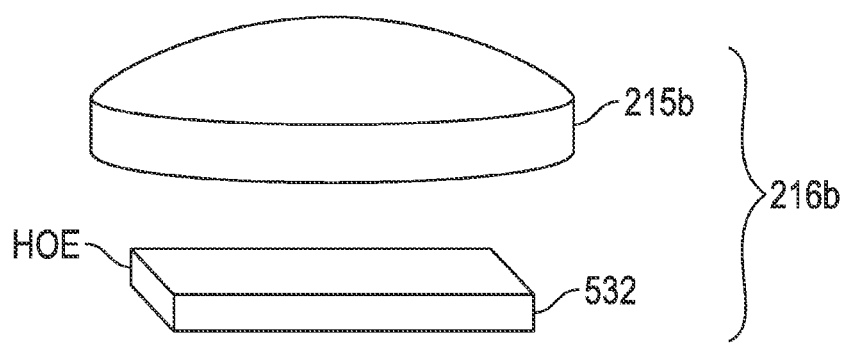
FIG. 5 is a schematic illustration of another asynchronous pulse detection configuration of the disclosed embodiments.
Figure 6A:
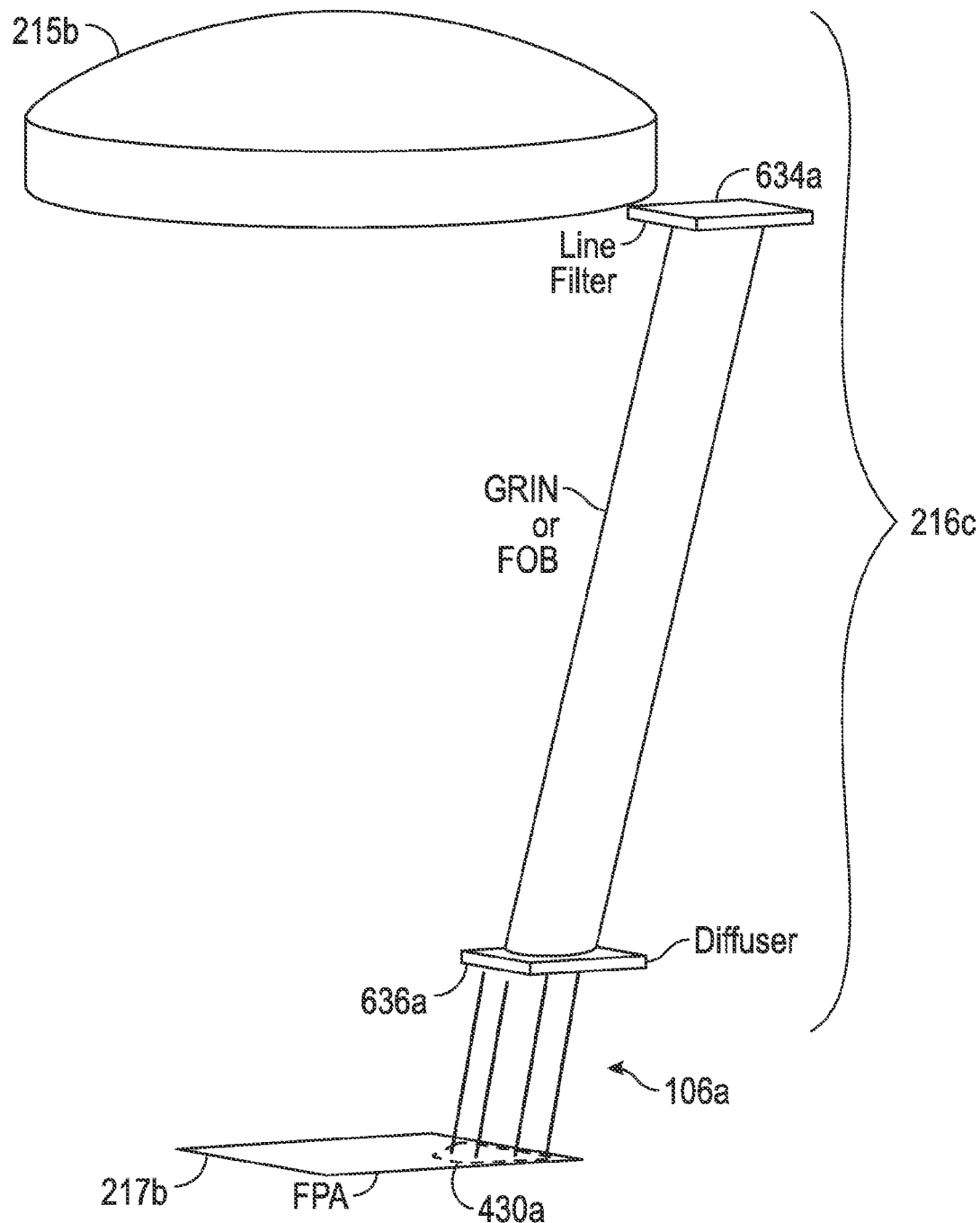
FIG. 6a is a schematic illustration of another asynchronous pulse detection configuration of the disclosed embodiments.
Figure 6B:
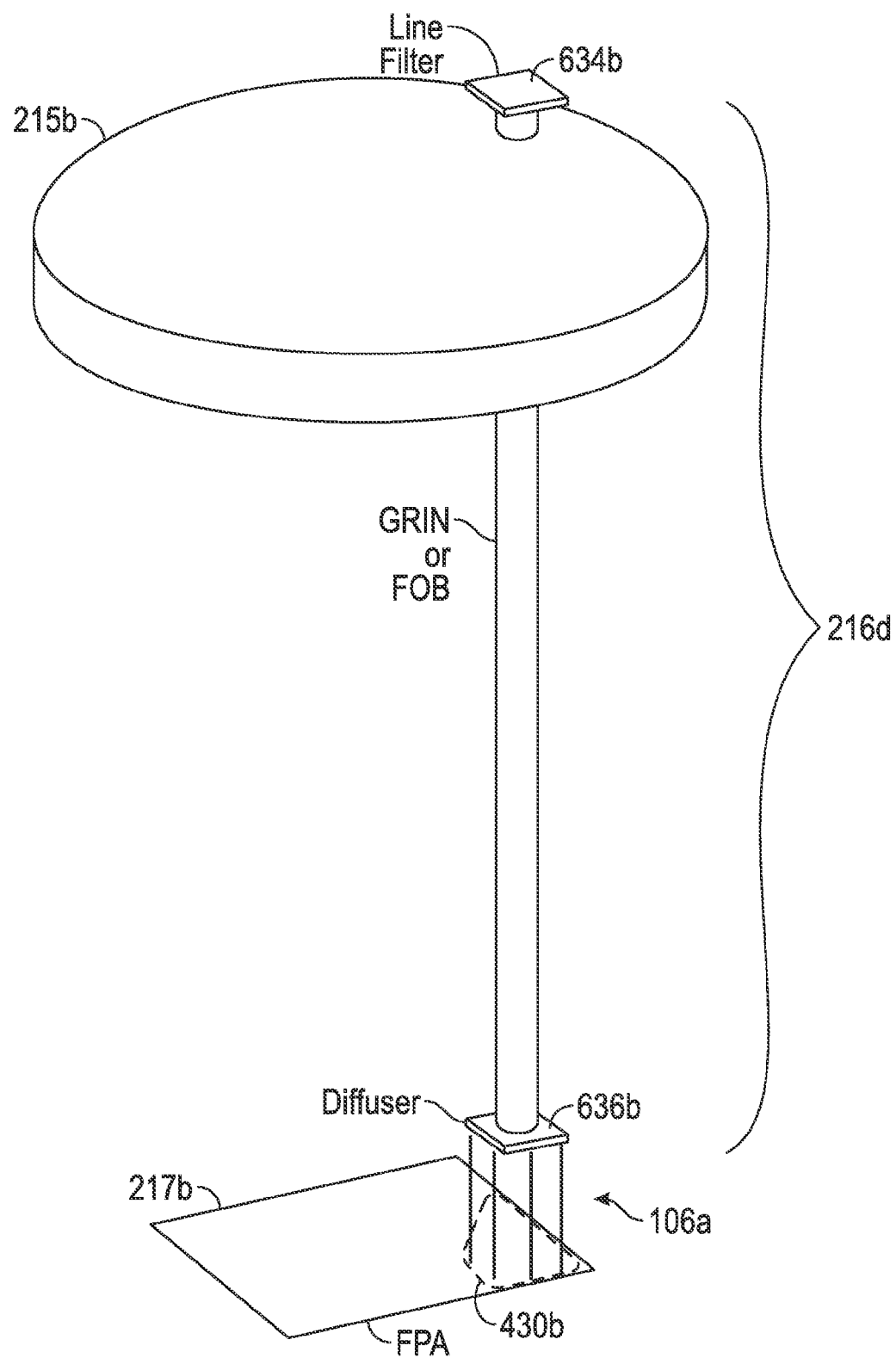
FIG. 6b is a schematic illustration of another asynchronous pulse detection configuration of the disclosed embodiments.
Figure 6C:
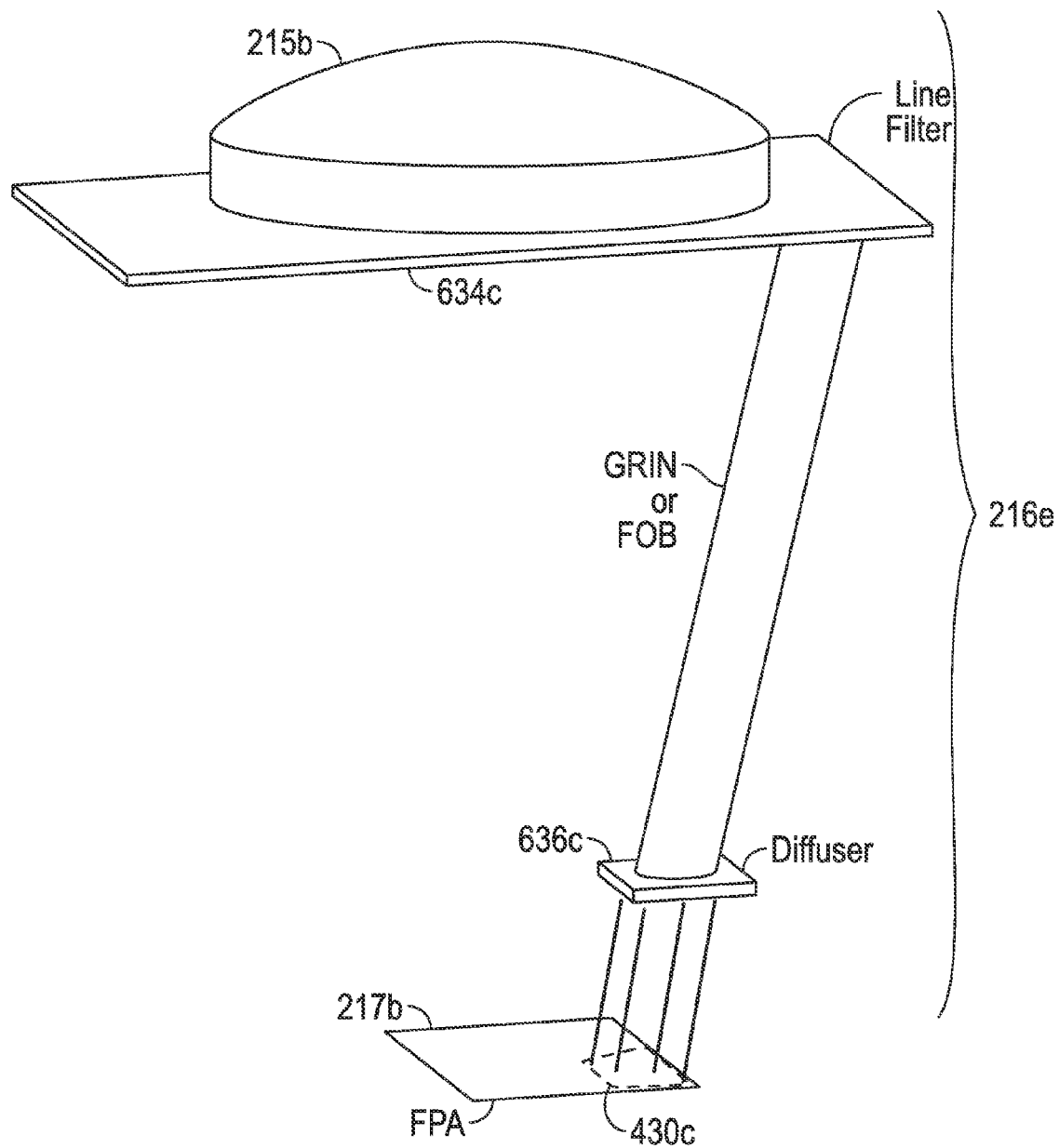
FIG. 6c is a schematic illustration of another asynchronous pulse detection configuration of the disclosed embodiments.
Figure 6D:
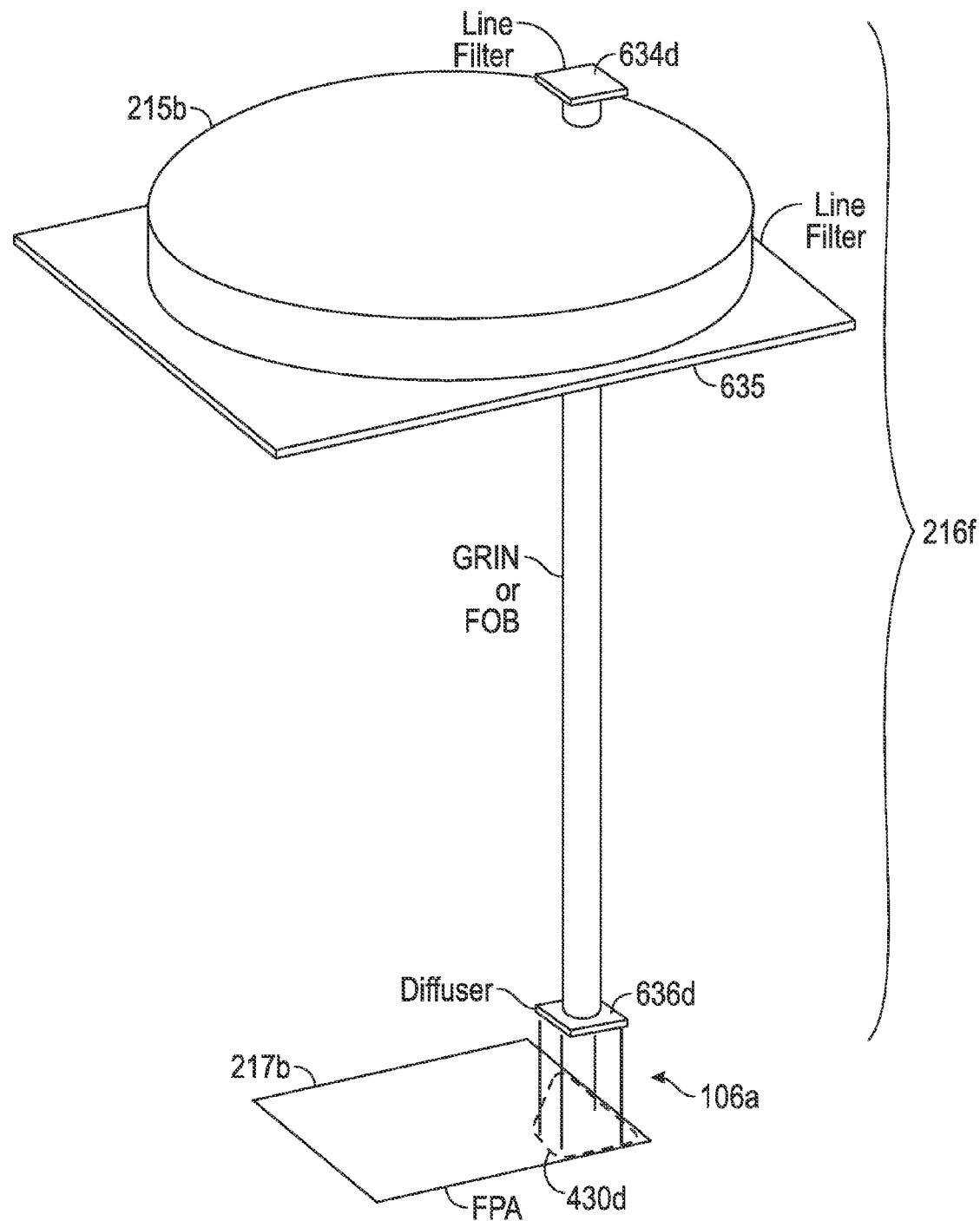
FIG. 6d is a schematic illustration of another asynchronous pulse detection configuration of the disclosed embodiments.
Figure 7:
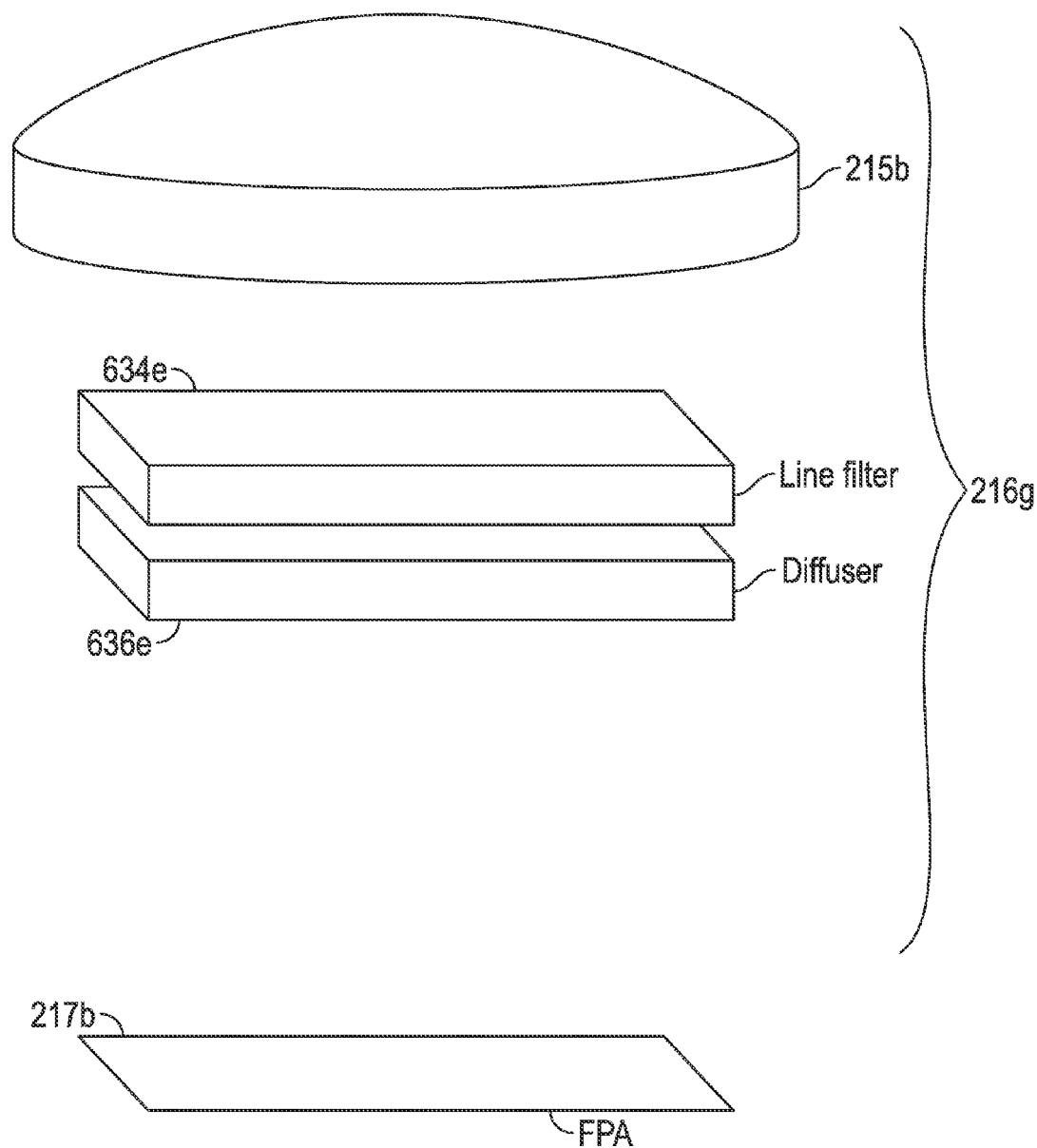
FIG. 7 is a schematic illustration of another asynchronous pulse detection configuration of the disclosed embodiments.

FIGS. 5 to 7 illustrate additional embodiments of the optical system 216 shown in FIG. 2. In connection with these embodiments, the following definitions will be used in various equations to further illustrate the embodiments of the present disclosure.

$\Omega$=solid angle, typically one pixel, (IFOV)^2 [SR steradians].

IFOV=Incremental field of view angle subtended by one element of a FPA [radians].

R=Range

Pulse=laser pulse energy in Joules [J], typically 100 mJ, typical pulse duration 20 ns.

L=scene radiance [W/(m^2 SR] SR=steradian.

$L_S$=typical scene radiance of entire SWIR spectral band (900 nm to 1700 nm typical).

$L_L$=typical scene radiance filtered by narrow bandpass laser line filter (e.g. 1024 nm+/−2 nm).

t=time (sec).

$t_{int}$=integration time of one detector element (pixel).

$t_i$=ith sequential pixel read out.

N=number of pixels (total).

M=number of pixels (total).

$A_s$=aperture area of optical path for SWIR scene.

$A_L$=aperture area of optical path for laser signal.

k=generic constant not derived here.

SWIR=Short Wave Infrared (900 nm to 1700 nm, typically).

Bsig=Background signal received from the scene.

Lsig=Laser signal received from the scene.

HOE=Holographic Optical Element.

The optical system 216a shown in FIG. 5 includes a lens configuration 215b, an HOE element 532 and a converter array or FPA 217b. Consider, for example, the lens configuration 215b and FPA 217b observing a scene with solar illumination. The signal in one pixel will depend on the solid angle of the pixel, receiver aperture $A_S$, scene radiance $L_S$ and pixel integration time $t_{int}$.

$$Bsig = A_S \cdot \Omega \cdot (L_S \cdot t) \cdot k$$

Where k is a general constant related to atmospheric transmission, target and background reflectivity, optical assembly transmission, among other factors. The derivation of k will be familiar to anyone skilled in the art and is not discussed further.

Assume that the optical system 216a will also receive a laser energy pulse reflected from the target, Lsig, which is determined by the laser optical path aperture $A_L$.

$$Lsig = \text{pulse} \cdot A_L \cdot \left(\frac{1}{R^2}\right) \cdot k$$

Assume that the background scene is the dominant noise term as compared to the sensor internal noise. Thus, the requirement for a minimum signal to noise ratio is determined by, $$SNR = \frac{Lsig}{Bsig}$$

Thereby, the laser signal 106 is spread over a number of pixels, and each pixel with integration time $t_{int}$ is sampled sequentially in reading out the FPA data with the ROIC. The laser energy is spread evenly over the total number of pixels. The minimum and maximum integration time available to the pixel is determined by several outside constraints such as sensor frame rate, FPA size, ROIC timing functions, and others.

As shown in FIG. 5, an optical component such as a HOE 532 may be included in the imager path such that the laser energy is spread evenly over N pixels. The laser aperture is equal to the imager aperture such that $A_L = A_S$. To achieve the required SNR the laser pulse signal is competing against the background signal of the imager scene, and the integration time in one pixel must be short enough to satisfy the following SNR equation.

$$SNR = \frac{\frac{1}{N} Lsig}{Bsig}$$

Thus, the total number of pixels N is given by, $$N = \frac{1}{SNR} \cdot \frac{Lsig}{Bsig}$$

or by, $$N = \frac{1}{SNR} \cdot \frac{\text{pulse}}{\Omega \cdot (L_S \cdot t_{int})} \cdot \frac{A_L}{A_S} \cdot \left(\frac{1}{R^2}\right) \cdot k$$

For the configuration shown in FIG. 5, the imager and laser optical path have the same aperture ($A_L = A_S$), and therefore, $$N = \frac{1}{SNR} \cdot \frac{\text{pulse}}{\Omega \cdot (L_S \cdot t_{int})} \cdot \left(\frac{1}{R^2}\right) \cdot k$$

Thus, $L_S$ is the scene radiance of the entire imager spectral band and $t_{int}$ is the integration time of one detector element. The laser pulse, producing the desired SNR in that pixel, will be detected in the jth pixel to be read out sequentially and the laser pulse time offset from the beginning $t_0$ readout time is, $$t_{pulse} = t_0 + (j \times t_{int})$$

Thus, the arrival time of the asynchronous laser pulse is detected and decoded for further processing. In the dual mode seeker implementation of the disclosed embodiments, further processing includes spatial and temporal resolution and further integration of image energy and laser energy.

The optical system 216 (shown in FIGS. 6a to 6d as reference numbers 216c to 216f) may include two paths for the image energy and the laser pulse energy, as illustrated in FIGS. 6a, 6b, 6c and 6d. The laser path is filtered by a conventional laser line filter (shown as elements 634a to 634d, and element 635) (not an HOE) such that the background scene radiance is reduced to $L_L$. A gradient index (GRIN) lens or fiber optic bundle (FOB) may be provided downstream of the line filter. Both the laser energy and the image energy are diffused by an optical diffusing element (shown as elements 636a to 636d) such that they arrive on M pixels (shown by laser energy 106a, and areas 430a, 430b, 430c and 430d). The sizes and shapes of the spread laser energy areas (430, 430a, 430b, 430c and 430d) shown in the FIGS are for illustration purposes and are not meant to limit the size, shape and/or the number of pixels for the spread laser energy areas of the disclosed embodiments. Four conceptual optical assemblies are shown FIGS. 6a to 6d as examples of possible configurations.

$$SNR = \frac{\frac{1}{M}Lsig}{Bsig}$$

The total number of pixels M is given by the equation, $$M = \frac{1}{SNR} \cdot \frac{Lsig}{Bsig}$$

Thus, the total number of pixels M is given by the equation, $$M = \frac{1}{SNR} \cdot \frac{pulse}{\Omega \cdot (L_L \cdot t_{int})} \cdot \frac{A_L}{A_S} \cdot \left(\frac{1}{R^2}\right) \cdot k$$

where $L_L$ is the scene radiance filtered by a narrow bandpass laser line filter, and $t_{int}$ is the integration time of one detector element. The laser pulse producing the desired SNR in that pixel will be detected by the jth pixel to be read out sequentially and the laser pulse time offset from the beginning to readout time is, $$t_{pulse} = t_0 + (j \times t_{int})$$

Thus, the arrival time of the asynchronous laser pulse is detected and decoded for further processing. In the dual mode seeker implementation of the disclosed embodiments, further processing includes spatial and temporal resolution and further integration of image energy and laser energy.

For the embodiment illustrated in FIG. 7, the optical assembly consists of one path for the image energy and the laser energy. The path is filtered by a conventional laser line filter 634e (not an HOE) such that the background scene radiance is reduced to $L_L$. Both the laser optical signal and the imager signal are diffused by an optical diffusing element 636e such that they arrive on M pixels. This is conceptually equivalent to the configurations shown in FIGS. 6a to 6d where $A_L = A_S$ and M simplifies to the following equation, $$M = \frac{1}{SNR} \cdot \frac{pulse}{\Omega \cdot (L_L \cdot t_{int})} \cdot \left(\frac{1}{R^2}\right) \cdot k$$

The laser pulse producing the desired SNR in that pixel, will be detected in the jth pixel to be read out sequentially and the laser pulse time offset from the beginning $t_0$ readout time is $$t_{pulse} = t_0 + (j \times t_{int})$$

Thus, the arrival time of the asynchronous laser pulse is detected and decoded for further processing. In the dual mode seeker implementation of the disclosed embodiments, further processing includes spatial and temporal resolution and further integration of image energy and laser energy.

Accordingly, it can be seen from the foregoing disclosure and the accompanying illustrations that one or more embodiments may provide some advantages. For example, the disclosed embodiments allow for the merging of two uniquely different types of seeker functionality into a single, dual-mode seeker, using only an FPA as the active sensor to achieve both modes of operation. The disclosed embodiments also provides a method of spreading laser photon energy over many separate pixels to improve the likelihood that the total sensing time of all the pixels together includes the laser pulse. The optical signal is spread over a number of pixels, N, on a FPA by means of optical components (e.g. defocus lens or diffractive optical element). The N pixels are read out sequentially in time with each sub-interval short enough that the integration of background photons competing with the laser pulse is reduced. Likewise, the pixel read times are staggered such that laser pulse energy will be detected by at least one pixel during the required pulse interval. The arrangement of the N pixels may be by FPA column, row, two dimensional array sub-window, or any combination of sub-windows depending on the optical path of the laser signal and the capability of the ROIC control.

Those of skill in the relevant arts will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the relevant arts will also appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

Finally, the methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. Accordingly, the disclosed embodiments can include a computer readable media embodying a method for performing the disclosed and claimed embodiments. Accordingly, the invention is not limited to illustrated examples and any means for performing the functionality described herein are included in the disclosed embodiments. Furthermore, although elements of the disclosed embodiments may be described or claimed in the singular, the plural is contemplated unless limitation to the singular is explicitly stated. Additionally, while various embodiments have been described, it is to be understood that aspects of the embodiments may include only some aspects of the described embodiments. Accordingly, the disclosed embodiments are not to be seen as limited by the foregoing description, but are only limited by the scope of the appended claims.

What is claimed is:

1. A system for asynchronous pulse detection comprising:
a converter array;
an optical system configured to pass laser energy at a predetermined band of wavelengths to said converter array, wherein said optical system is further configured to spread said predetermined band of wavelengths across a predetermined area; and
a read out integrated circuit (ROIC) that scans said predetermined area of said array at an exposure rate that matches a predetermined PRF to thereby decode said predetermined band of wavelengths spread by said optical systems across said predetermined area of said array.

2. The system of claim 1 wherein said optical system comprises a defocusing element that spreads said predetermined band of wavelengths across a predetermined area of said array.

3. The system of claim 1 further comprising a seeker system that uses said decoded predetermined band of wavelengths to derive control information capable of being used to steer an ordnance to a target.

4. The system of claim 1 wherein said optical system spreads said predetermined band of wavelengths over a predetermined number of separate pixels such that a total sensing time of said separate pixels includes said predetermined band of wavelengths.

5. The system of claim 4 wherein said predetermined number of separate pixels are read out sequentially.

6. The system of claim 5 wherein said read out times of said separate pixels are staggered.

7. A method of detecting laser energy comprising:
filtering the laser energy having a predetermined bandwidth;
spreading said predetermined bad width across a predetermined area of an array; and
scanning said predetermined area of said array at an exposure rate that matches a predetermined pulse repetition frequency (PRF) to thereby decode said predetermined band of wavelengths that has been spread across said predetermined area of said array.

8. The method of claim 7 further comprising using said decoded predetermined band of wavelengths to derive control information capable of being used to steer an ordnance to a target.

9. The method of claim 7 further comprising:
capturing image energy focused on said array; and
using said captured image energy to derive control information capable of being used to steer an ordnance to a target.

10. The method of claim 9 further comprising locating a laser spot of said decoded predetermined band of wavelengths on said image.

11. The method of claim 7 wherein said predetermined area comprises a predetermined number of separate pixels such that a total sensing time of said separate pixels includes said predetermined band of wavelengths.

12. The method of claim 11 further comprising reading out said predetermined number of separate pixels sequentially.

13. The method of claim 12 further comprising staggering said reading out of said separate pixels.

* * * * *